United States Patent
Chu

(10) Patent No.: US 10,193,315 B2
(45) Date of Patent: Jan. 29, 2019

(54) CORRUGATED TUBE ASSEMBLY FOR RECEIVING LINES, AND METHOD FOR PRODUCING SUCH A CORRUGATED TUBE ASSEMBLY

(71) Applicant: Schlemmer GmbH, Poing (DE)

(72) Inventor: Van-Ngoc Chu, Poing (DE)

( * ) Notice: Subject to any disclaimer, the term of this patent is extended or adjusted under 35 U.S.C. 154(b) by 0 days.

(21) Appl. No.: 15/525,913

(22) PCT Filed: Nov. 5, 2015

(86) PCT No.: PCT/EP2015/075851
§ 371 (c)(1),
(2) Date: May 10, 2017

(87) PCT Pub. No.: WO2016/075030
PCT Pub. Date: May 19, 2016

(65) Prior Publication Data
US 2017/0310094 A1    Oct. 26, 2017

(30) Foreign Application Priority Data
Nov. 11, 2014   (DE) .................. 10 2014 116 447

(51) Int. Cl.
*H02G 3/04* (2006.01)
*H02G 3/06* (2006.01)

(52) U.S. Cl.
CPC ......... *H02G 3/0468* (2013.01); *H02G 3/0691* (2013.01)

(58) Field of Classification Search
CPC .. H02G 3/0468; H02G 3/0691; H02G 3/0475; H02G 3/0481; H02G 3/0487;
(Continued)

(56) References Cited

U.S. PATENT DOCUMENTS 4,513,787 A * 4/1985 Hegler ................. H02G 3/0468
174/68.3
4,986,575 A * 1/1991 Braun ................... H02G 3/0468
285/133.11
(Continued)

FOREIGN PATENT DOCUMENTS

CN    101484741 A    7/2009
CN    102290749 A    12/2011
(Continued)

OTHER PUBLICATIONS

ISA European Patent Office, International Search Report Issued in Application No. PCT/EP2015/075851, dated Jan. 13, 2016, WIPO, 4 pages.
(Continued)

*Primary Examiner* — Chau N Nguyen
*Assistant Examiner* — Roshn K Varghese
(74) *Attorney, Agent, or Firm* — Alleman Hall Creasman & Tuttle LLP

(57) ABSTRACT

A corrugated tube assembly comprises an inner and an outer corrugated tube made of plastic with circumferential corrugations and with a respective longitudinal slot. A longitudinal strip on the inner corrugated tube with corrugations with the same shape and distribution as the corrugations on the outer corrugated tube protrudes into the longitudinal slot of the outer corrugated tube, the outer diameter of the respective corrugations corresponding to one another. The terminal cross-sections of all the corrugations on both corrugated tubes are closed. The two longitudinal sides of the longitudinal strip are connected to the rest of the inner corrugated tube via a respective V-shaped depression. When the two corrugated tubes are plugged together such that the corrugations of the two corrugated tubes are in engagement, each lateral edge of the longitudinal slot of the outer corrugated (Continued)

Figure 14:
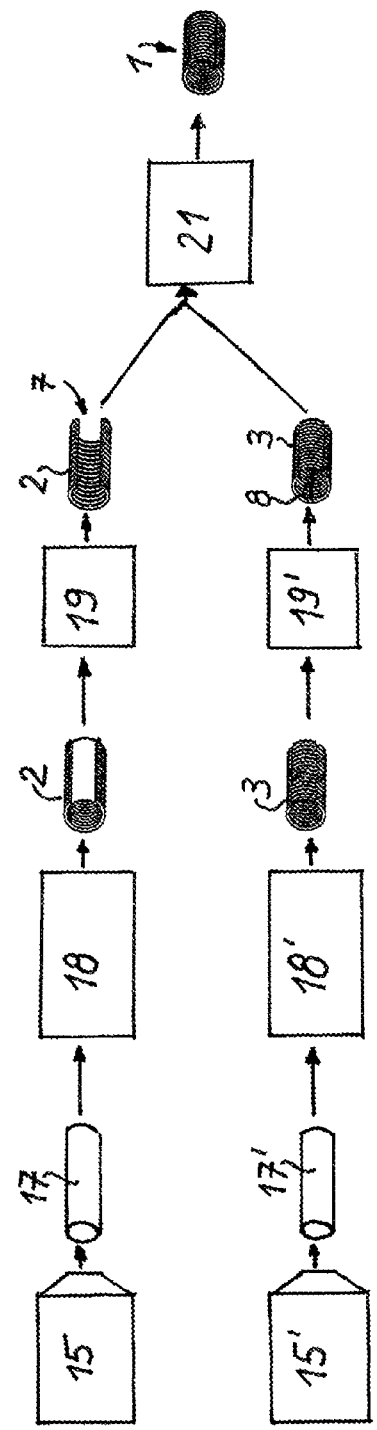

tube protrudes into a V-shaped depression of the inner corrugated tube.

13 Claims, 3 Drawing Sheets

(58) Field of Classification Search
CPC ........ H02G 9/065; H02G 3/04; H02G 3/0462; F16L 11/18; F16L 25/0036; F16L 9/006; B60R 16/0215; B29C 43/226; B29C 47/0066; B29C 2043/3634
USPC ...................................................... 174/102 D
See application file for complete search history.

(56) References Cited

U.S. PATENT DOCUMENTS

| | | | |
|---|---|---|---|
| 6,096,975 A * | 8/2000 | Streit .................... | B29C 47/126 174/68.3 |
| 6,164,338 A | 12/2000 | Holzer et al. | |
| 7,939,761 B2 * | 5/2011 | Baverel ................ | B29C 47/126 174/93 |
| 2005/0126094 A1* | 6/2005 | Shimizu .................... | F16L 3/26 52/220.1 |
| 2009/0014198 A1* | 1/2009 | Shimizu ............... | H02G 3/0468 174/102 R |

FOREIGN PATENT DOCUMENTS

| | | |
|---|---|---|
| CN | 103782460 A | 5/2014 |
| CN | 203813358 U | 9/2014 |
| DE | 19827435 A1 | 12/1999 |
| DE | 29906905 U1 | 9/2000 |
| DE | 102012204418 A1 | 9/2013 |
| EP | 0268869 A2 | 6/1988 |
| EP | 0859440 A1 | 8/1998 |
| EP | 2182599 A1 | 5/2010 |
| JP | 2000115942 A * | 4/2000 |
| JP | 2000184551 A | 6/2000 |

OTHER PUBLICATIONS

State Intellectual Property Office of the People's Republic of China, Office Action and Search Report Issued in Application No. 201580072836.5, dated Apr. 4, 2018, 18 pages.
Japanese Patent Office, Office Action Issued in Application No. 2017526600, dated Jul. 17, 2018, 4 pages.
Korean Intellectual Property Office, Office Action Issued in Application No. 10-2017-7015919, Sep. 3, 2018, 10 pages.

* cited by examiner

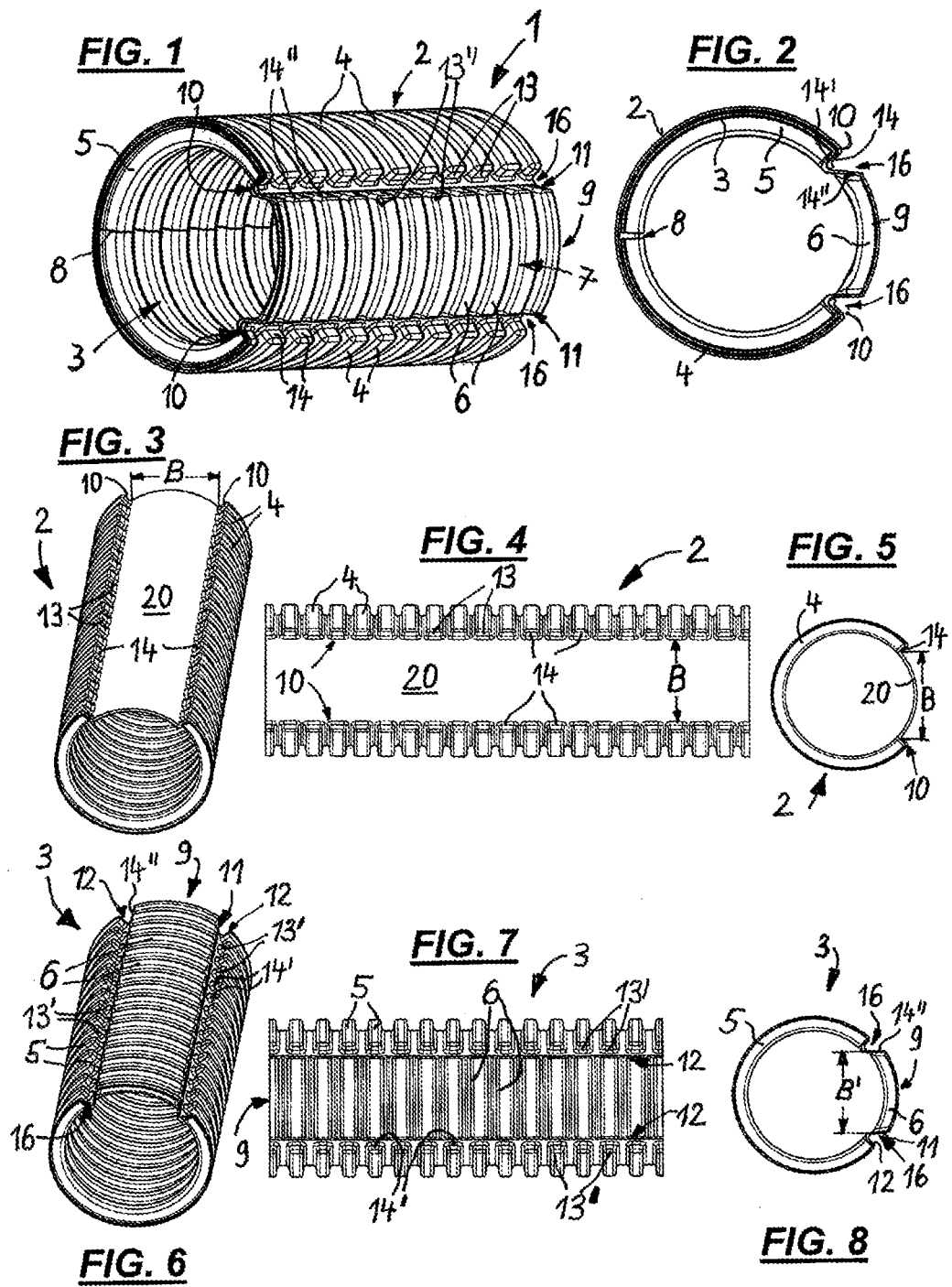

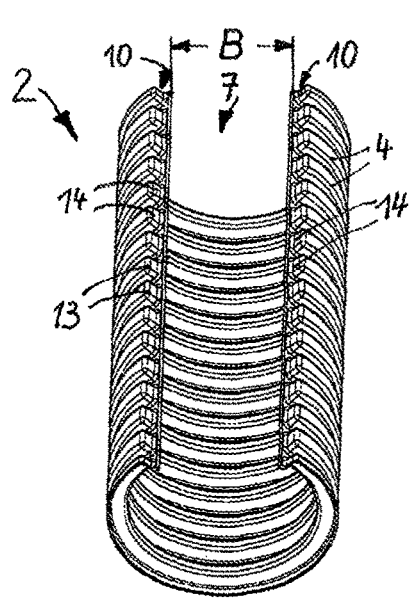
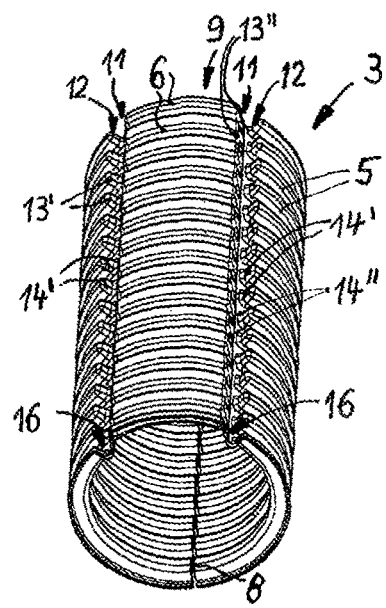
FIG. 9  FIG. 10
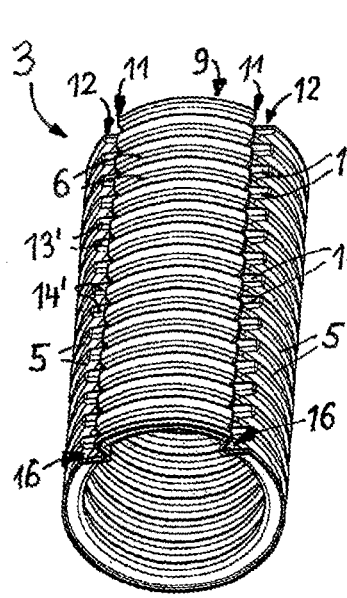
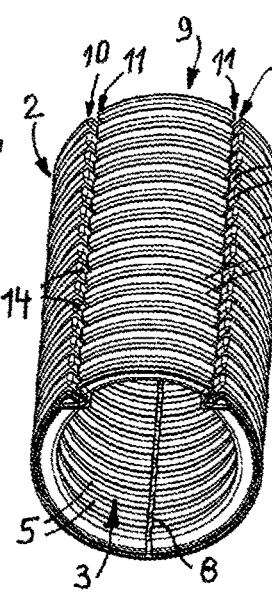
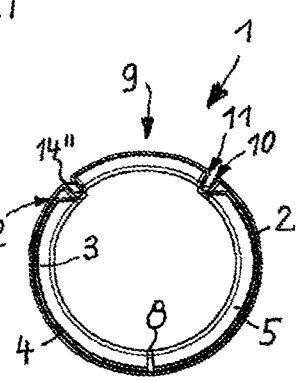
FIG. 11  FIG. 12  FIG. 13

CORRUGATED TUBE ASSEMBLY FOR RECEIVING LINES, AND METHOD FOR PRODUCING SUCH A CORRUGATED TUBE ASSEMBLY

The invention relates to a corrugated tube assembly for receiving lines, wiring harnesses or the like, comprising an inner and an outer respectively flexible corrugated tube made from plastic with circumferential corrugations and with in each case one longitudinal slot, it being possible for the outer corrugated tube to be plugged onto the inner corrugated tube with mutual radial engagement of the corrugations of the two corrugated tubes, a longitudinal bar which is configured on the inner corrugated tube protruding radially into the longitudinal slot of the outer corrugated tube in the plugged-on state and covering said longitudinal slot, which longitudinal bar is provided with corrugations of identical shape and pitch to those on the outer corrugated tube, and the external diameter of which corresponds to that of the corrugations on the outer corrugated tube.

A corrugated tube assembly of this type is known from EP 0 268 869 A. Said known assembly preferably serves to receive wiring harnesses in motor vehicles and is used to a large extent in this field of application. Here, particularly satisfactory flexibility of a corrugated tube assembly of this type arises by way of the corrugations on the outer and on the inner tube.

It has now been shown, however, that, in the case of specific trucks, for instance in the case of construction vehicles or the like which are used in a highly dusty or dirty environment, dust and dirt particles can penetrate during the vehicle operation from the outer side of the corrugated tube assembly into its interior space, to be precise via the open radial end cross sections of the corrugations, which open radial cross sections are produced during cutting out of the longitudinal slot on the two side edges of the longitudinal slot of the outer corrugated tube, it being possible for the dust or dirt particles in the radial intermediate space between the corrugations of the inner and the outer corrugated tube which are in engagement with one another to pass in the circumferential direction as far as the point, at which the longitudinal slot is made in the inner corrugated tube, through which longitudinal slot they can then enter into the interior of the inner corrugated tube, where the lines or the wiring harness or the like are accommodated, which is very undesirable. In addition, said disadvantage occurs in a very particularly clear manner in the case of a curved state of the known corrugated tube assembly.

Preceding herefrom, the invention aims to develop a known corrugated tube assembly of the type mentioned at the outset, in such a way that said corrugated tube assemblies can be used even in a very dusty or dirty environment. In addition, a method for producing a corrugated tube assembly according to the invention of this type is also to be specified.

According to the invention, this is achieved in the case of a corrugated tube assembly of the type mentioned at the outset by virtue of the fact that the radial end cross sections of all corrugations are closed on both side edges both of the longitudinal slot of the outer corrugated tube and of the longitudinal bar on the inner corrugated tube and on the longitudinal sides of the remaining cross section of the inner corrugated tube which run on both sides of said longitudinal bar, the longitudinal bar of the inner corrugated tube being connected to the remaining cross section of the inner corrugated tube on both longitudinal sides in each case via a depression which is V-shaped in radial cross section and runs radially as far as the internal diameter of the corrugations of the inner corrugated tube, and that, in the plugged-together state of the two corrugated tubes, each side edge of the longitudinal slot of the outer corrugated tube protrudes into the V-shaped depression on the facing longitudinal side of the longitudinal bar of the inner corrugated tube.

It is ensured in the case of the corrugated tube assembly according to the invention that no open end cross sections at all are any longer present in the unavailable longitudinal slots which occur on the circumference of the outer corrugated tube between the side edges of its longitudinal slot and the side edges of the longitudinal bar of the inner corrugated tube, which longitudinal bar protrudes into said longitudinal slot, at those ends of all corrugations which are present there in each case, which open end cross sections still permit a penetration of dust or dirt into the interior of the individual corrugations; rather, all end cross sections are closed.

By way of the measures according to the invention, therefore, a penetration of dust or dirt into the interior of the corrugated tube assembly is prevented considerably, both on the path via the corrugations of the longitudinal bar of the inner corrugated tube, and via the corrugations of the outer corrugated tube and the corrugations of the remaining inner corrugated tube which are in engagement with the former.

Since, in the case of the corrugated tube assembly according to the invention, the longitudinal bar of the inner corrugated tube, which longitudinal bar is offset radially to the outside and, in the assembled state, protrudes into the longitudinal slot of the outer corrugated tube, is connected on its two longitudinal sides to the remaining section of the inner corrugated tube in each case via a V-shaped groove, into each of which one of the side edges of the longitudinal slot of the outer corrugated tube protrudes, a radially closed transition region is produced over the entire length of the assembly in the region between the longitudinal bar and the side edges of the remaining cross section of the inner corrugated tube, which transition region connects the closed end cross sections of the corrugations in each case on one longitudinal side of the remaining section of the inner corrugated tube and the closed end cross sections of the corrugations there to one another, which end cross sections are present on the associated side edge of the longitudinal bar, within a continuous V-shaped depression or groove. The longitudinal edge of the longitudinal slot of the outer corrugated tube, which longitudinal edge protrudes in each case into a V-shaped depression of this type, can be received satisfactorily there with its radially inwardly directed end face, in which all closure coverings of the end cross sections there of the corrugations also lie.

The corrugated tube assembly according to the invention is eminently suitable for use in vehicles under dusty or dirty environmental conditions, and ensures that dirt and dust particles can scarcely any longer penetrate into the interior of the corrugated tube assembly along the longitudinal extent of said assembly.

The closure of the end cross sections of the individual corrugations along the longitudinal sides of the longitudinal slot on the outer corrugated tube and the longitudinal bar on the inner corrugated tube and on the longitudinal sides which are present on both sides of the longitudinal bar on the remaining cross section of the inner corrugated tube can be carried out in any suitable form. Said end cross sections of the corrugations are particularly preferably closed, however, by way of coverings which are configured in one piece with them and have already been configured during the shaping of the relevant corrugated tube in the corrugator.

In the case of the corrugated tube assembly according to the invention, the corrugations on the two corrugated tubes are advantageously configured so as to run either in an annularly circumferential or helical manner.

The shaping of the inner corrugated tube further preferably takes place in such a way that, in cross section, that side wall of each V-shaped depression which faces away from the longitudinal bar is oriented radially, which allows the forming of the two V-shaped depressions during the production of the inner corrugated tube in the corrugator to be performed via merely one of the two mold jaws of the respective mold, which can subsequently be pulled off radially.

Instead of this but also in cross section, that side wall of each V-shaped depression which is connected to the longitudinal bar can likewise advantageously be oriented radially, it being possible for only in each case one V-shaped depression to be configured in this case during the shaping in the corrugator by way of each of the two mold jaw halves of the respective mold.

It is advantageous, furthermore, if, in the case of a corrugated tube assembly according to the invention, the wall thicknesses of the inner and outer corrugated tube are of identical magnitude or are of substantially identical magnitude.

It is advantageous, furthermore, if, in the unloaded state of the two corrugated tubes, the longitudinal slot of the outer corrugated tube has a greater width than the longitudinal slot of the inner corrugated tube, which prevents it being possible for the outer tube to accidentally pass into the longitudinal slot of the inner tube, even in the case of a very brief assembly of the two corrugated tubes. Here, the inner corrugated tube is particularly preferably slotted only along a rectilinear, radially oriented cutting plane, with the result that, after the slitting has taken place, the two side edges of the slot either lie directly next to one another or are spaced apart from one another only by a very small spacing, for instance 1 mm.

In one particularly advantageous refinement of the invention, the closed end cross sections of the corrugations of the outer corrugated tube lie in each case in the side edges of its longitudinal slot, and, likewise in a preferable manner, the closed end cross sections of the corrugations of the inner corrugated tube on each longitudinal side of its longitudinal bar and the closed end cross sections of the corrugations on each longitudinal bar of the remaining cross section of the inner corrugated tube are provided in each case in the plane of one of the two side walls of the associated V-shaped depression.

A particularly favorable method for producing an assembly according to the invention, as depicted above, comprises the following method steps:

a) a first plastic tube is extruded from an extruder, and an outer corrugated tube for the corrugated tube assembly is configured in a downstream corrugator with the configuration of circumferential corrugations on its circumference, in which, however, no corrugations are provided within a circumferential segment with a predefined width, and all radial end sections of the corrugations are closed on the longitudinal sides on both sides of the circumferential segment;

b) a second plastic tube is extruded from an extruder, and an inner corrugated tube for the corrugated tube assembly is configured in a downstream corrugator with the configuration of circumferential corrugations of identical pitch to those on the outer corrugated tube on the circumference, a longitudinal bar being attached in a manner which is offset radially to the outside within a circumferential segment of a width which corresponds to that of the circumferential segment on the outer corrugated tube, which longitudinal bar is connected on each of its two side edges to the remaining section of said inner corrugated tube via a V-shaped depression which extends radially as far as the internal diameter of the corrugations of said inner corrugated tube, the radial end cross sections of the corrugations being closed on the two longitudinal sides of the longitudinal bar, and the end cross sections of the corrugations on both sides of the longitudinal bar being closed on the longitudinal sides of the remaining cross section of said inner corrugated tube;

c) the circumferential segment, on which no corrugations are attached, is cut out on the outer corrugated tube and a longitudinal slot is produced as a result;

d) the inner corrugated tube is likewise slotted in the longitudinal direction;

e) finally, the outer corrugated tube is plugged onto the inner corrugated tube with elastic widening of its longitudinal slot, in such a way that the longitudinal bar of the inner corrugated tube protrudes radially into the longitudinal slot of the outer corrugated tube, and each side edge of said longitudinal slot engages into the V-shaped depression on the facing longitudinal side of the inner corrugated tube.

The method according to the invention permits relatively simple and uncomplicated production of a corrugated tube assembly according to the invention which can be assembled rapidly.

The extrusion of the two plastic tubes which are formed to produce the outer corrugated tube and to produce the inner corrugated tube might also readily take place in an extruder with two separate spray nozzles, two corresponding mold configurations then being provided in the respective mold of a downstream corrugator. Two extruders with in each case the same downstream corrugator are advantageously used, however, for the extrusion of the two plastic tubes, as a result of which the extrusion of the two plastic tubes is carried out parallel to one another from each of the extruders.

As has already been stated further above, in the case of the method according to the invention, the slitting of the inner corrugated tube in its longitudinal direction takes place only along a rectilinear cutting plane, as a result of which a longitudinal slot with a very small width is produced, in which even the longitudinal edges of said longitudinal slot lie directly next to one another or can even touch one another.

The corrugations on the outer corrugated tube and on the inner corrugated tube which are formed in the method according to the invention can be different with regard to their corrugation shapes, but must not differ too much from one another in terms of their shape, in order that the inner tube with its corrugations does not come out of engagement with the corrugations of the outer tube during bending of the corrugated tube assembly. In every case, the corrugations on the outer and on the inner corrugated tube are configured with an identical pitch.

During slitting of the inner corrugated tube in its longitudinal direction, the slot position is preferably provided diametrically opposite the longitudinal bar.

In the following text, the invention will be explained in greater detail in principle by way of example using the figures, in which:

FIG. 1 shows a perspective illustration of a corrugated tube assembly according to the invention, FIG. 2 shows a front view of the corrugated tube assembly from FIG. 1, FIG. 3 shows a perspective illustration of the outer corrugated tube of the corrugated tube assembly from FIG. 1, but before the longitudinal slot is cut out, FIG. 4 shows a view (from above) of the outer corrugated tube from FIG. 3, FIG. 5 shows a front view of the corrugated tube from FIG. 4, FIG. 6 shows a perspective illustration of the inner corrugated tube of the corrugated tube assembly from FIG. 1, FIG. 7 shows a view from above of the inner corrugated tube from FIG. 6, FIG. 8 shows a front view of the inner corrugated tube from FIG. 7, FIG. 9 shows a perspective view of the outer corrugated tube from FIG. 3, but after the longitudinal slot has been cut out, FIG. 10 shows the inner corrugated tube according to FIG. 6, but after the longitudinal slot has been made on it, FIG. 11 shows a perspective illustration of a different embodiment of the inner corrugated tube than that in FIG. 6, FIG. 12 shows a perspective illustration of a corrugated tube assembly according to the invention in accordance with FIG. 1, but with the inner corrugated tube according to FIG. 11, FIG. 13 shows a front view of the corrugated tube assembly from FIG. 12, and FIG. 14 shows a diagrammatic illustration of the steps for producing a corrugated tube assembly according to the invention.

In the following description of the figures, identical parts are provided with an identical designation in the different figures.

FIG. 1 shows a perspective illustration of a corrugated tube assembly 1 according to the invention which is shown in a front view in FIG. 2.

The corrugated tube assembly 1 consists of an outer corrugated tube 2, into which an inner corrugated tube 3 is inserted, the corrugations 4 of the outer corrugated tube 2 being in engagement with the corrugations 5 of the inner corrugated tube 3, that is to say the corrugations 5 of the inner corrugated tube 3 which have an identical pitch to the corrugations 4 of the outer corrugated tube 2 protrude radially into said corrugations 4.

The outer corrugated tube 2 is shown in a perspective illustration in FIG. 3, in plan view in FIG. 4, and in a front view in FIG. 5, FIG. 3 to FIG. 5 showing the outer corrugated tube 2 in a state, in which it has not yet been provided with a longitudinal slot. The outer corrugated tube 2 in its finished state, that is to say after configuration of a longitudinal slot 7, is represented in a perspective illustration in FIG. 9.

As can be seen from FIGS. 3 to 5, the outer corrugated tube 2 is provided on its outer circumference with corrugations 4 which do not, however, run around its entire outer circumference. It can be gathered from the illustration of FIGS. 3 to 5 that no corrugations 4 are configured within a circumferential segment with a width B on the outer corrugated tube 2, but rather a smooth material region 20 which runs around in the manner of a cylindrical section is present there only at the level of the bases of the corrugations 4, which material region 20, in order to configure a longitudinal slot 7 on the outer corrugated tube 2 (cf. illustration of FIG. 9), is cut out along the longitudinal edges 10 of the longitudinal slot 7 which are configured on both sides of the material region 20, with the result that a shape of the outer corrugated tube 2 as shown in FIG. 9 is then produced.

All corrugations 4 on the outer corrugated tube 2 run on each side of the longitudinal slot 7 as far as its longitudinal edges 10, each corrugation 4 configuring an end cross section 13 in each longitudinal edge 10.

The inner corrugated tube 3 which is arranged in the interior of the outer corrugated tube 2 is shown in a perspective view in FIG. 6, in a plan view of the illustration of FIG. 6 in FIG. 7, and in a front view with respect to FIG. 7 in FIG. 8, the inner corrugated tube 3 not yet having been provided with a longitudinal slot in the illustrations of FIGS. 6 to 8.

FIG. 10 then shows a perspective illustration of the configuration of the inner corrugated tube 3 including the longitudinal slot 8 which is made on it.

As FIGS. 6 to 8 and 10 show, the inner corrugated tube 3 is provided on its outer circumference with circumferential corrugations 5 of an identical pitch to the corrugations 4 on the outer corrugated tube 2, which corrugations 5, just like the corrugations 4 on the outer corrugated tube 2, do not run around completely: no more corrugations 5 are made on the outer circumference of the inner corrugated tube 3 within a circumferential segment of a width B which corresponds to the width of the longitudinal slot 7 of the outer corrugated tube 2. Rather, as can be seen clearly from the illustration, in particular, of FIG. 8, a radially outwardly protruding longitudinal bar 9 is provided there which is likewise provided on its radial outer side with corrugations 6 which correspond in terms of their shape and pitch to the corrugations 4 on the outer circumference of the outer tube 2 and have the same external diameter as the latter.

The corrugations 5 on the outer circumference of the inner corrugated tube 3 which all end at in each case one longitudinal edge 12 also configure in each case end cross sections 13' there, whereas the corrugations 6 on the longitudinal bar 9 lie at their ends in two longitudinal edges 12 which delimit them and configure in each case end cross sections 13" there.

It is essential then that all end cross sections 13, 13' and 13", in which said corrugations end in the longitudinal edges 10 of the longitudinal slot 7 or the longitudinal edges 12 on the inner corrugated tube 3 or the longitudinal edges 11 on both sides of the longitudinal bar 9, are not configured as open cross sections, but rather as closed cross sections. This can be achieved, for example, by virtue of the fact that each of said end cross sections 13, 13' and 13" is closed in each case via a covering 14 and 14' and 14", respectively, which closes it completely (in the sense of an end wall which is attached there), said covering as a rule already being attached in one piece on the relevant corrugation 4 during the configuration of the relevant corrugated tube in the corrugator.

As FIGS. 6, 8 and 10 show, the longitudinal bar 9 is connected on both sides on its side edges 11 in each case via a depression 16 to the associated longitudinal edge 12 of the corrugations 5, as FIG. 8 shows clearly, said V-shaped depression 16 running from the outer circumference of the corrugations 6 on the longitudinal bar 9 radially as far as the internal diameter of the corrugations 5 of the inner corrugated tube 3.

As can be gathered from FIGS. 3 and 5, the end cross sections 13 on the longitudinal edges 10 of the outer corrugated tube 2 protrude in the radial direction as far as the inner circumference of the corrugations 4, a minor angular deviation from a radial orientation (for instance, in an order of magnitude of from 1° to 3°) also being possible (in the following text, this is always addressed, however, merely as a "radial" orientation for the sake of brevity).

If the longitudinal slot 7 is cut out on the outer corrugated tube 2, with the result that its configuration is produced as shown in FIG. 9, this means that the ends of the corrugations 4 are configured in the longitudinal edges 10 in the form of radially running coverings 14 and protrude radially inward there.

In the assembled state of the corrugated tube assembly 1, as shown in FIGS. 1 and 2, said perpendicularly inwardly running coverings 14 of the end cross sections 13 protrude into the V-shaped depressions 16 on the inner corrugated tube 3, as can be seen in the front view from FIG. 2.

The inner corrugated tube 3 is likewise provided with a longitudinal slot 8 on its circumference at a point which lies diametrically opposite the longitudinal bar 9 (as shown in FIG. 2 or else FIG. 10), which longitudinal slot 8, however, unlike the longitudinal slot 7 on the outer corrugated tube 2, has only a very small width and is also slit open here only in the longitudinal direction along a slot plane. This can be configured in such a way that, in the state of the corrugated tube assembly 1 in which the components are assembled inside one another, the side faces of the longitudinal slot 8 of the inner corrugated tube 3 touch or lie next to one another in such a way that they just do not touch. A greater thickness of the longitudinal slot 8 might also be provided.

As FIG. 1, 2 or else 10 show, in the assembled state of the corrugated tube assembly 1, the longitudinal bar 9 which is configured on the inner corrugated tube 3 protrudes into the longitudinal slot 7 of the outer corrugated tube 2 in such a way that the corrugations 6 on the longitudinal bar 9 in this region are a type of continuations of the corrugations 4 on the outer corrugated tube 2. However, there is in each case a small intermediate gap during the circulation of the corrugations 4 and 6 at the points, at which the depressions 16 are made, that is to say in the region between the longitudinal edges 10 on the outer corrugated tube 2 and the longitudinal edges 11 on both sides of the longitudinal bar 9.

Since, however, all end faces 13, 13' and 13" of the corrugations 4, 5 and 6 are of closed configuration at the end edges 10, 11 and 12, although dust and dirt can penetrate from the environment into the V-shaped depression 16, it cannot penetrate into the interior of the corrugations 4, 5 and 6. The corrugated tube assembly 1 is completely sealed against a penetration of dust, dirt or the like from the outside into its interior because the V-shaped depressions 16 are configured in cross section, however, with a continuous wall and do not have any sections which are open into the interior of the corrugations 4, 5 and 6. This is also not changed if the corrugated tube assembly 1 is installed in a curved state, since all open end cross sections of the corrugations 4, 5 and 6 are of closed configuration.

The perspective illustration of FIG. 11 then shows one alternative embodiment of an inner corrugated tube 3 in comparison with that according to FIG. 6.

The difference between the two embodiments consists in that, in the case of the embodiment according to FIG. 11, as can be gathered best from the front view of FIG. 13, the end cross sections of the corrugations 6 have a radial orientation on both sides of the longitudinal bar 9 along the longitudinal edge 10 which exists there in each case, whereas that side of the V-shaped depression 16 which faces away from the longitudinal edge 9 runs at an angle with respect to the radial direction. In contrast, this is different in the case of the configuration of the V-shaped depression 16 in the example of FIGS. 6 to 8 and 10, in so far as, in the case of the V-shaped depression 16 there, its side face which lies on the side of the longitudinal bar 9 runs at an angle with respect to the radial orientation, whereas that side of the V-shaped depression 16 which faces away from the longitudinal bar 9 is oriented radially.

FIG. 14 shows an outline illustration of the steps during the production of a corrugated pipe assembly 1 according to the invention:

A plastic tube 17 is extruded from an extruder 15, which plastic tube 17 is fed to an adjoining corrugator 18 for shaping. In said corrugator 18, the shaping of the plastic tube 17 takes place to form an outer corrugated tube 2 in the shape as shown in FIGS. 3 to 5, that is to say without a longitudinal slot 7 having been introduced.

Said corrugated tube 2 is then guided through a slitting apparatus 19, in which the longitudinal slot 7 is introduced, with the result that the part which leaves the slitting apparatus 19 corresponds to the finished shape of the outer corrugated tube 2, as shown in FIG. 9.

Parallel to said production of the outer corrugated tube 2, another plastic tube 17' is extruded from a second extruder 15', which other plastic tube 17' is given a shape in a downstream corrugator 18', which shape corresponds to the shape of the inner corrugated tube 3, as shown in FIGS. 6 to 8. Said inner corrugated tube 3 is then guided through a slitting device 19', in which a thin longitudinal slot 8 is configured on the inner corrugated tube 3 so as to lie diametrically opposite the longitudinal bar 9.

Subsequently, in each case one produced outer corrugated tube 2 (with a longitudinal slot 7) is guided jointly with a produced inner corrugated tube 3 (with a longitudinal slot 8) to a combining device 21 and, in the latter, the inner corrugated tube 3 is introduced through the longitudinal slot 7 of the outer corrugated tube 2 into the latter, with the result that a finished corrugated tube assembly 1 is output from the combining device 21.

As far as the configuration of the outer corrugated tube 2 and the inner corrugated tube 3 is concerned, it is to be noted that the corrugations 4, 5 and 6 on both are configured in each case with an identical pitch to one another, with the result that, during the assembly, the corrugations 5 of the inner corrugated tube 3 can engage on the radial inner side into the corrugations 4 of the outer corrugated tube 2. Here, the shape of the corrugations does not have to be completely identical. They can be of different configuration, but the difference must not be so great that, in the case of a tube being bent (during the installation of the corrugated tube assembly), the corrugations 5 of the inner tube pass out of engagement with the corrugations 4 of the outer tube.

As far as the corrugations 6 on the longitudinal bar 9 of the inner tube 3 are now concerned, these are to have not only the same pitch, but also the same shape as the corrugations 4 on the outer corrugated tube 2, with the result that there are identical corrugations 4 and 6 on the outer side of the corrugated tube assembly 1 in the circulating direction.

The corrugations themselves can be made in an annularly circumferential or else helical manner.

The corrugated tube 1 according to the invention is usually produced according to a production method, as outlined in FIG. 14, that is to say the outer corrugated tube 2 and the inner corrugated tube 3 are assembled and are delivered to the customer in this assembled state. The fitting of the corrugated tube assembly 1 with cables or a cable harness or the like does not take place until at the customer who, in the case of a delivered corrugated tube assembly 1, separates the outer corrugated tube 2 and the inner corrugated tube 3 again, then introduces the desired cable harness or the like into the inner corrugated tube, and subsequently inserts the inner corrugated tube 3 which has been provided with the latter into the outer corrugated tube 2 again.

In the illustrations in the figures, the specification of lines or cable harnesses or the like which are introduced into the corrugated tube assembly 1 has been dispensed with, since the introduction thereof into the corrugated tube assembly is not a subject of the invention.

The corrugated tube assembly 1 according to the invention reliably prevents the undesired penetration of dust, dirt or the like, even in the case of very dusty or dirty use conditions, because it configures a system which is closed on all sides and ensures a sealing action which is as good as hermetic of the interior space of the corrugated tube assembly with respect to its outer side.

The invention claimed is:

1. A corrugated tube assembly for receiving lines, wiring harnesses or the like, comprising an inner and an outer respectively flexible corrugated tube made from plastic with circumferential corrugations and within each case one longitudinal slot, it being possible for the outer corrugated tube to be plugged onto the inner corrugated tube with mutual radial engagement of the corrugations of the two corrugated tubes, a longitudinal bar which is configured on the inner corrugated tube protruding radially into the longitudinal slot of the outer corrugated tube in a plugged-on state and covering said longitudinal slot, which longitudinal bar is provided with corrugations of identical shape and pitch to those on the outer corrugated tube, and an external diameter of which corresponds to that of the corrugations on the outer corrugated tube, characterized in that radial end cross sections of all corrugations are completely closed by way of coverings that are formed integrally with the corrugations on a first and a second side edge of the longitudinal slot of the outer corrugated tube and a third and a fourth side edge of the longitudinal bar on the inner corrugated tube and a fifth and a sixth side edge on longitudinal sides of a remaining cross section of the inner corrugated tube which runs on both sides of said longitudinal bar, the longitudinal bar of the inner corrugated tube is connected on both longitudinal sides to the remaining cross section of the inner corrugated tube in each case via a depression which is V-shaped as seen in a radial cross section and runs radially as far as an internal diameter of the corrugations of the inner corrugated tube, each V-shaped depression being defined between the third and the fifth edge and the fourth and the sixth edge, respectively, and in that, in a plugged-together state of the two corrugated tubes, each side edge of the longitudinal slot of the outer corrugated tube protrudes into each V-shaped depression on a respective facing longitudinal side of the longitudinal bar of the inner corrugated tube.

2. The corrugated tube assembly as claimed in claim 1, characterized in that the corrugations are attached on the two corrugated tubes in an annularly circumferential or helical manner.

3. The corrugated tube assembly as claimed in claim 1, characterized in that, in cross section, that side wall of each V-shaped depression which faces away from the longitudinal bar is oriented radially.

4. The corrugated tube assembly as claimed in claim 1, characterized in that, in cross section, that side wall of each V-shaped depression which is connected to the longitudinal bar is oriented radially.

5. The corrugated tube assembly as claimed in claim 1, characterized in that wall thicknesses of the inner and outer corrugated tube are of identical magnitude.

6. The corrugated tube assembly as claimed in claim 1, characterized in that, in an unloaded state of the two corrugated tubes, the longitudinal slot of the outer corrugated tube has a greater width than the longitudinal slot of the inner corrugated tube.

7. The corrugated tube assembly as claimed in claim 1, characterized in that the closed end radial cross sections of the corrugations of the outer corrugated tube lie in the side edges of its longitudinal slot.

8. The corrugated tube assembly as claimed in claim 1, characterized in that the closed end radial cross sections of the corrugations of the inner corrugated tube on each longitudinal side of its longitudinal bar and the closed end radial cross sections on each longitudinal side of the remaining cross section of the inner corrugated tube lie in each case in a plane of one of two side walls of the V-shaped depression.

9. A method for producing a corrugated tube assembly as claimed in claim 1, in which the following method steps are carried out:
   a) a first plastic tube is extruded from an extruder and an outer corrugated tube for the corrugated tube assembly is configured in a downstream corrugator with circumferential corrugations on its circumference, in which no corrugations are provided within a first circumferential segment of a predefined width, and all radial end cross sections of the corrugations are closed on longitudinal sides of both sides of the first circumferential segment;
   b) a second plastic tube is extruded from the extruder and an inner corrugated tube for the corrugated tube assembly is configured in the downstream corrugator with circumferential corrugations on its circumference of identical pitch to those on the outer corrugated tube, on which second plastic tube a longitudinal bar is provided offset radially toward the outside within a second circumferential segment of a width which corresponds to that of the first circumferential segment on the outer corrugated tube, which longitudinal bar is connected to the remaining cross section of the inner corrugated tube on each of its two side edges via a V-shaped depression which extends radially as far as the internal diameter of the corrugations of the inner corrugated tube, the radial end cross sections of the corrugations being closed on longitudinal sides of the longitudinal bar, and the radial end cross sections of the corrugations on both sides of the longitudinal bar being closed on the longitudinal sides of the remaining cross section of the inner corrugated tube;
   c) the first circumferential segment, on which no corrugations are attached, is cut out on the outer corrugated tube and a longitudinal slot is produced as a result;
   d) the inner corrugated tube is likewise slit in a longitudinal direction;
   e) finally, the outer corrugated tube is plugged onto the inner corrugated tube with elastic widening of its longitudinal slot, in such a way that the longitudinal bar of the inner corrugated tube protrudes radially into the longitudinal slot of the outer corrugated tube, and each side edge of said longitudinal slot engages into the V-shaped depression on the facing longitudinal side of the inner corrugated tube.

10. The method as claimed in claim 9, in which the extrusion of the two plastic tubes is carried out in parallel to one another via one dedicated extruder for each plastic tube, respectively.

11. The method as claimed in claim 9, in which the slitting of the inner corrugated tube in its longitudinal direction is performed only along a rectilinear cutting plane.

12. The method as claimed in claim 9, in which the corrugations on the outer corrugated tube and on the inner corrugated tube are configured with a pitch which is identical to one another.

13. The corrugated tube assembly as claimed in claim 1, characterized in that each V-shaped depression comprises a side face that lies on the side of the longitudinal bar and runs at an angle with respect to the radial orientation, whereas a side of the V-shaped depression that faces away from the longitudinal bar is oriented radially.

\* \* \* \* \*